United States Patent [19]

Bullis et al.

[11] Patent Number: 5,535,626

[45] Date of Patent: Jul. 16, 1996

[54] SENSOR HAVING DIRECT-MOUNTED SENSING ELEMENT

[75] Inventors: Robert H. Bullis, Avon; James L. Swindal, East Hampton; Walter J. Wiegand; Charles R. Winston, Jr., both of Glastonbury, all of Conn.

[73] Assignee: Breed Technologies, Inc., Lakeland, Fla.

[21] Appl. No.: 361,277

[22] Filed: Dec. 21, 1994

[51] Int. Cl.$^6$ .................................................. G01P 15/08
[52] U.S. Cl. ........................ 73/514.32; 361/280; 73/493
[58] Field of Search .......................... 73/517 R, 517 AV, 73/651, 650, 649, 652, 493, 718, 724, DIG. 1; 361/280, 283.3

[56] References Cited

U.S. PATENT DOCUMENTS

| | | | |
|---|---|---|---|
| 4,405,970 | 9/1983 | Swindal et al. | 361/283 |
| 4,441,370 | 4/1984 | Sakurada | 73/651 |
| 4,737,236 | 4/1988 | Perko et al. | 156/644 |
| 4,879,627 | 11/1989 | Grantham | 361/283 |
| 4,928,203 | 5/1990 | Swindal et al. | 361/280 |
| 4,987,779 | 1/1991 | McBrien | 73/517 B |
| 5,069,071 | 12/1991 | McBrien et al. | 73/654 |
| 5,092,174 | 3/1992 | Reidemeister et al. | 73/517 R |
| 5,115,291 | 5/1992 | Stokes | 73/517 R |
| 5,128,581 | 7/1992 | Nakayama et al. | 73/517 R |
| 5,381,300 | 1/1995 | Thomas et al. | 73/517 R |

OTHER PUBLICATIONS

"An ASIC for High–resolution Capacitive Microaccelerometers" by H. Leuthold & F. Rudolph of CSEM (Centre Suisse d'Electronique et de Microtechnique S.A.), Sensors and Actuators, A21–A23 (1990) pp. 278–281.

*Primary Examiner*—Hezron E. Williams
*Assistant Examiner*—Helen C. Kwok
*Attorney, Agent, or Firm*—Andrew C. Greenberg; Arthur W. Fisher, III

[57] ABSTRACT

A silicon capacitive microsensor which is sensitive to acceleration forces includes a silicon capacitive sensing element 10 comprising three silicon layers 12,16,26 having glass dielectric layers 14,24 between each pair of silicon layers with the middle silicon layer 16 consisting of a proof mass 18 suspended between the two glass dielectric layers 14,24 by a silicon hinge 20 which is connected to a slightly thicker silicon support layer 17 around the periphery (FIG. 3 ) between the glass layers 14,24 (FIG. 1 ). Three metallic bond pads 40,42,44 on the surface 45 of the silicon layers 26,16, 12, respectively, are soldered to circuit trace pads 108 on a circuit board 100 which has a glass upper layer 104 and a silicon support layer 102. The thermal expansion coefficient between the glass layer 104 and the sensing element 10 are substantially the same, thereby minimizing thermally induced stresses on the sensing element 10 and minimizing inaccuracies associated therewith. Such direct mounting greatly simplifies the manufacturing process for such sensors. Also, such direct mounting eliminates flying leads thereby allowing the sensing element 10 to be fabricated to much smaller dimensions than that of the prior art.

8 Claims, 6 Drawing Sheets

SENSOR HAVING DIRECT-MOUNTED SENSING ELEMENT

TECHNICAL FIELD

This invention relates to semiconductor-based microsensors and, more particularly, to direct mounting of semiconductor-based sensing elements of such microsensors to system and subsystem circuit boards.

BACKGROUND ART

It is known in the art of silicon capacitive microsensors (SCM's) and, more particularly, accelerometers, that such sensors (or transducers) include a silicon capacitive sensing element which senses acceleration forces based on a change in capacitance. Such a sensing element may typically comprise three layers of conductive silicon (i.e., silicon which is doped to be conductive) having glass dielectric layers between each pair of silicon layers. The middle silicon layer consists of a proof mass suspended along one side by one or more silicon hinges which are within and connected to a slightly thicker support layer (or framework) of silicon between the glass layers. There may typically be two metal electrodes, one on the surface of each of the glass dielectric layers which face the silicon proof mass. Each electrode is electrically connected to its corresponding outer silicon layer. A first capacitor exists between one surface of the proof mass and one electrode and a second capacitor exists between the other surface of the proof mass and the other electrode.

Electrically conductive lead wires are attached to each of the three conductive silicon layers and are fed to known DC or low frequency AC electronics, e.g., operational amplifier configurations. The electronics provide an output electrical signal indicative of the change in capacitance caused by displacement of the proof mass about the hinges toward either of the two metal electrodes due to acceleration applied to the sensing element.

Also, one of the outer silicon layers is typically treated as a base with which the sensing element is mounted to a rigid board, e.g., a ceramic circuit board. The large flat plane of the board is then placed at right angles to the acceleration to be sensed.

The sensing element cannot be directly rigidly mounted to a typical ceramic circuit board because the difference in thermal expansion coefficients between the circuit board and the silicon base of the sensing element causes uneven external stresses to be exerted on the sensing element over the operational temperature of the device. Such stresses cause the proof mass and the gaps between the proof mass and the electrodes, to become offset and give erroneous acceleration measurements. Also, such stresses weaken and deteriorate the solder joint attachments or connections between the sensing element and the board. As a result, the sensing element is typically mounted to the circuit board with spacers, e.g., one or more tiny spherical balls at each contact point, coated with an adhesive (e.g., silicone rubber) which is compliant over temperature to relieve any thermal expansion mismatch between the sensing element and the board. Typically, flying (or dangling) electrical leads (or wires) extend from the sensing element to such circuit board. Also, the board to which the sensing element is mounted is typically mounted by right angle brackets to a separate circuit board which contains the electronics to interface with the sensing element. Such a bracket allows the electronic circuit board to be housed in a horizontal position while the sensing element is responsive to horizontal acceleration, e.g., for an automotive airbag application.

The attachment of such flying leads and the attachment and precision orientation of such angle brackets require extra steps in the manufacturing process. Such a mounting technique makes such sensors difficult and costly to manufacture. Also, use of such thermally compliant adhesive is difficult to work with when manufacturing microelectronics due to potential for contamination of the electronics.

Thus it would be desirable to eliminate such deficiencies of the prior art techniques.

DISCLOSURE OF INVENTION

Objects of the invention include a silicon microsensor which has reduced cost and complexity of manufacture and which minimizes thermal induced stress on the sensing element portion thereof.

According to the present invention a sensor comprises a sensing element, comprising at least one element mounting surface wherein the sensing element is used for sensing a parameter and wherein the sensing of the parameter is affected by stresses exerted on the element through the element mounting surface; a mounting board having a board mounting surface to which the element mounting surface is mounted; mounting means disposed between the element mounting surface and the board mounting surface for hard-mounting at least one region of the element mounting surface to a corresponding region of the board mounting surface; and the board mounting surface being made of at least one material which has substantially the same coefficient of thermal expansion as the materials making up the region of the element mounting surface where the mounting occurs, thereby minimizing thermally-induced stresses exerted on the element mounting surface and the sensing element by the mounting board over a predetermined operational temperature range.

According further to the present invention, the element mounting surface comprises a first dielectric material, or a semiconductor material, or both.

According still further to the present invention, the board mounting surface to which the element mounting surface is mounted comprises a dielectric layer made of a second dielectric material.

In still further accord to the present invention, the sensing element comprises a differential capacitive sensor.

The present invention represents a significant improvement over the prior art by the discovery that a silicon microsensor sensing element can be directly mechanically and electrically hard-mounted to a circuit (or mounting) board and to electrically conductive traces disposed thereon. The circuit board comprises a dielectric layer, such as glass, having a thermal expansion coefficient closely matched to the thermal expansion coefficient of silicon, upon which the electrical traces are disposed. Also, a layer of silicon under the glass layer is provided for support. This technique greatly reduces the cost and complexity of fabrication of a silicon microsensor by eliminating the need for precision balls with thermally compliant adhesive for mounting the sensing element to a circuit (or support) board and also removes the need for flying lead wires, while providing a mounting surface which has an almost perfect thermal expansion coefficient match between the mounting board and the silicon sensing element and permits a desired mounting orientation without requiring right-angle brackets. Therefore, minimal stress is induced in the sensing element component over temperature variations, and, thus, any error associated with such temperature-induced stress is minimized or eliminated. As a result, a temperature insensitive sensing device is obtained.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
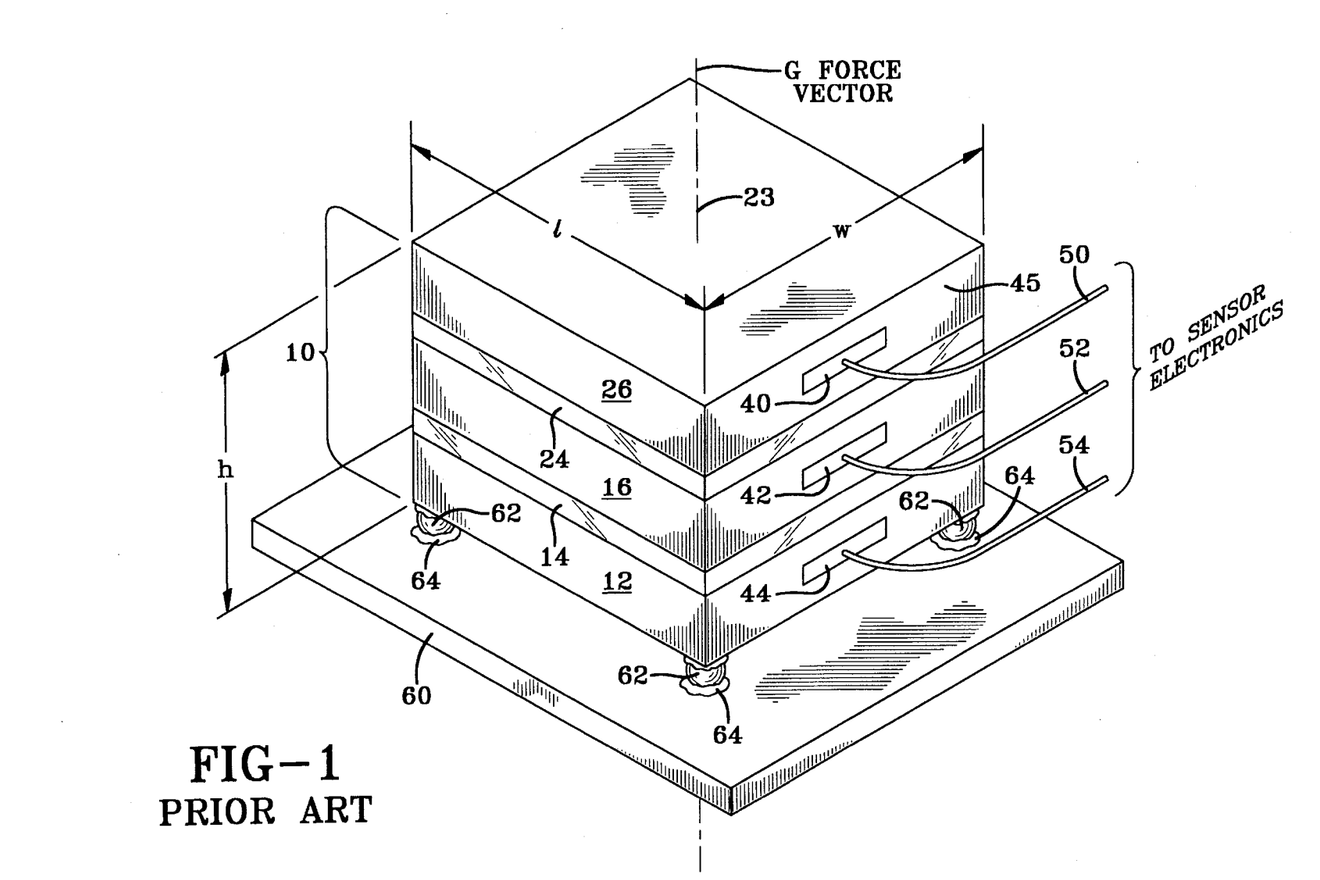
FIG. 1 is a perspective view of a prior art mounting of a known silicon capacitive acceleration sensing element.
Figure 2:
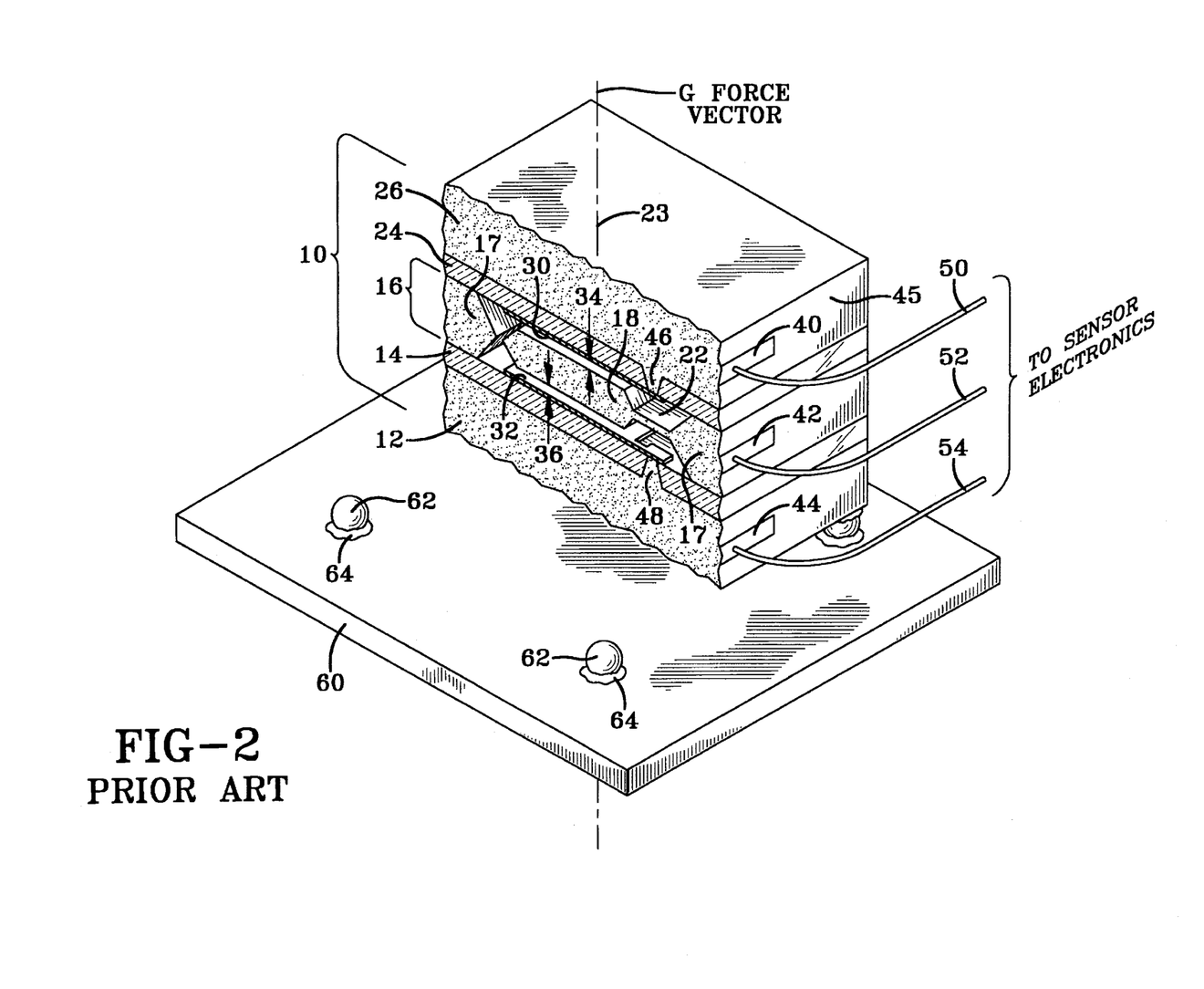
FIG. 2 is a cross-sectional perspective view of the prior art silicon capacitive acceleration sensing element of FIG. 1.

Referring to FIGS. 1 and 2, a prior art silicon capacitive acceleration sensor similar to that currently sold by Vaisala Technologies, Inc., Finland, Part No. SCA 12, includes a sensing element 10 having overall dimensions of about 3.8 mm long (1)×4.3 mm wide (w)×3 mm high (h). The sensing element 10 comprises a base 12 made of silicon (Si) having a thickness of about 1.15 mm. Above the layer 12 is a layer 14 made of glass having a thickness of about 0.15 mm. Adjacent to the layer 14 is a layer 16 made of silicon and having a thickness of about 0.38 mm which comprises a silicon support layer 17 (FIG. 2) around the perimeter of the element 10 and a silicon proof mass 18 having a thickness of slightly less than 0.38 mm, a length of 1.7 mm, and a width of 3.0 mm. The silicon support layer 17 provides an air tight seal around the proof mass 18.

Figure 3:
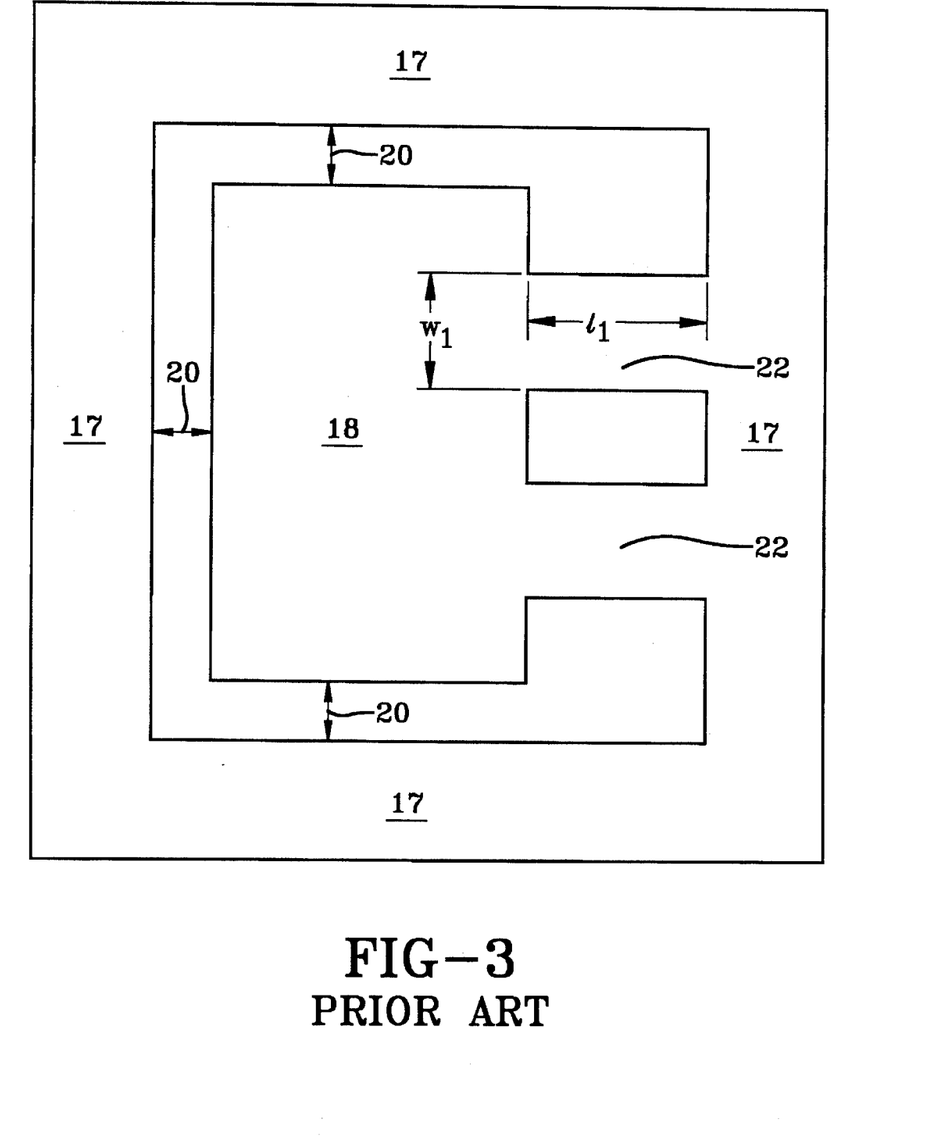
FIG. 3 is a cross-sectional top view of the prior art silicon capacitive acceleration sensing element of FIG. 1.

Referring to FIGS. 2 and 3, the proof mass 18 is supported along one side by two hinges 22, having a length of about 0.62 mm ($l_1$) between the support and the proof mass 18 and having a width of about 0.46 mm ($w_1$) along one side of the proof mass 18. The hinge 22 is connected to and integral with the silicon support layer 17. The hinge 22 is a cantilever-type hinge which allows the proof mass 18 to swing pivotally in response to external acceleration forces or "G" along a "G" force vector 23. The hinge 22 may actually be a plurality of successive coplanar hinges separated by a predetermined spacing. Also, there is a space 20 of about 0.1 mm, between the other three sides of the proof mass 18 and the support layer 17. Alternative hinge arrangements and spacing may be used if desired and are not critical to the present invention, such as U.S. Pat. No. 4,928,203, entitled "Capacitive Accelerometer with Hinges on Top and Bottom Surface", to Swindal et al.

Above the silicon layer 16 is a layer 24 made of glass having a thickness of about 0.15 mm, similar to the layer 14. Above the glass layer 24 is an layer 26 made of silicon having a thickness of about 1.15 mm. The glass layers 14,24 act as dielectric insulators between the conductive silicon layers 12,16 and between the conductive silicon layers 16,26, respectively.

On the underside of the glass layer 24 and the upper side of the glass layer 14 exist metal electrodes 30,32, respectively. Also, between the lower surface of the electrode 30 and the upper surface of the proof mass 18 there exists a gap 34. Symmetrically, between the upper surface of the electrode 32 and the lower surface of the proof mass 18 there exists a gap 36. The gaps 34,36 have a size of about 3.8 microns (0.0038 mm) in steady state with no acceleration applied to the sensing element 10. The gaps 34,36 expand to meet the hinge 22. Also, the gaps 34,36 contain a predetermined gas, e.g., argon at a prescribed pressure, designed to provide a predetermined amount of mechanical damping on the proof mass 18 by use of fluid dynamic squeeze-film damping.

Metallic contacts (or bond pads) 40,42,44 are provided on a side surface 45 of the silicon layers 26,16,12, respectively, typically by vapor deposition of metal onto rectangular regions of the layers 26,16,12. Also, the layers 26,12 have flat-top silicon pyramidal protrusions 46,48 which penetrate the glass layers 24,14, respectively, to allow the silicon layers 26,12 to come in contact with the metal electrodes 30,32, respectively. The pyramidal silicon region 46 allows an electrical connection to exist between the metal electrode 30 and the metallic contact 40 on the silicon layer 26. Symmetrically, the inverted pyramidal silicon region 48 allows an electrical connection to exist between the metal electrode 32 and the metallic contact 44 on the silicon base layer 12. Electrically conductive flying leads 50,52,54 are soldered to the contacts 40,42,44, respectively, and are fed to known electronic circuits (not shown) located on a nearby circuit board.

The sensing element 10 is mounted to a ceramic board 60 by means of four spherical rigid balls 62 coated with a thermally compliant adhesive material 64 (e.g., silicone rubber). The balls 62 are disposed between the upper surface of the ceramic board 60 and the lower surface of the base silicon layer 12 of the sensing element 10. The balls 62 are spherical in shape and are made of a rigid material, such as glass or metal (e.g., copper) and have a diameter of about 0.05 to 0.10 mm. The coating 64 around the balls 62 is made of a material which adheres to the lower surface of the layer 12, to the balls 62, and to the upper surface of the ceramic board 60. Additionally, the adhesive material 64 must allow the ceramic board 60 to expand and contact over temperature in a direction perpendicular to the G-force vector 23 so as not to exert excessive stresses on the layer 12. Also, it should be understood that, instead of a single ball at each contact point, there may be a plurality of balls close together at each contact point.

The purpose of the balls 62 is to allow the lower surface of the base layer 12 to be mounted to the ceramic board 60 so as to provide a fixed distance between the lower surface of the layer 12 and the board 60 which does not vary due to acceleration forces in the direction of the G-force vector 23. If the sensing element were hard-mounted directly to the ceramic board 60 without the balls 62 and the compliant adhesive 64 at one or more locations on the bottom of the layer 12, the different thermal expansion coefficients between the ceramic board 60 and the silicon layer 12 would create sufficient stresses in the layer 12 so as to deform the sensing element and alter the gaps 34,36, thereby producing errors in acceleration measurement (as discussed hereinbefore in the Background Art section herein).

The sensing element 10 operates, as is known, to detect acceleration by a change in capacitance between the upper surface of the proof mass 18 and the lower surface of the metal electrode 30 and a complementary change in capacitance between the lower surface of the proof mass 18 and the upper surface of the metal electrode 32. The flying leads 50,52,54 are provided to known electronic circuits (not shown) operating at DC or low frequency AC which sense this change in differential capacitance and provide an output voltage indicative thereof. Thus, when an acceleration or "G" force is exerted in a direction parallel to the line 23, the proof mass 18 moves, changing the gaps 34,36 in equal but opposite directions, thereby altering the differential capacitance. The electronic circuits detect this change in capacitance and provide a voltage indicative thereof, thereby providing a voltage indicative of the acceleration, as is known.

If the sensing element 10 were rotated so as to mount the sensing element 10 on the side 45 where the metal contacts 40,42,44 are located, and it was desired to mount the pads directly to traces on the ceramic circuit board 60, a similar problem of the aforementioned stresses and sensing errors would develop due to the aforementioned mismatch in thermal expansion coefficients between the siliconglass layers 12,14,16,24,26 and the ceramic board 60 typically made of aluminum oxide. The thermal expansion coefficient for silicon is about 1.8 to $3.2 \times 10^{-6}/°$ C. from $-40°$ to $125°$ C., for glass is about $3.2 \times 10^{-6}/°$ C., and for aluminum oxide is about $5.4 \times 10^{-6}/°$ C. Additionally, such stresses may also cause degradation in the hard-mount solder connections with thermal cycling over time as is well known in the art.

The sensor electronics (not shown) may be mounted to the ceramic circuit board 60 or, alternatively, to a second circuit board (not shown) which is mechanically coupled to the ceramic circuit board 60 by a right-angle bracket (not shown). In either case, the lower surface of the silicon base layer 12 of the sensing element 10 must be located perpendicular to the "G" force vector 23 within ±0.5° to be acceptable for certain acceleration applications, e.g., automotive airbag sensors. This accuracy is achievable in the prior art because the bottom surface of the silicon base layer 12 is both flat and parallel to the surfaces of the proof mass 18 (which are normal to the vector 23). As such, the balls 62 must have a diameter accuracy which meets the required mounting accuracy for the given application.

Furthermore, all the other sides of the sensing element 10 (excluding the top and bottom) are not perpendicular to the surfaces of the proof mass (which are normal to the vector 23) because they are cut with a saw. More specifically, the sensing element 10 is fabricated as a large sheet having many sensing elements thereon and this large sheet is then cut into rectangular shapes to create each sensing element. Consequently, due to the thickness of the silicon layers 12,26, these other sides typically have a tolerance of ±3°. Therefore, such a non-perpendicular side surface makes it even more difficult to mount the sensor to the board 60 on the side 45 of the sensing element 10 where the metal pads 40,42,44 are located, especially if the technique of using the balls 62 and the adhesive 64 are used in such a mounting scheme.

Figure 4:
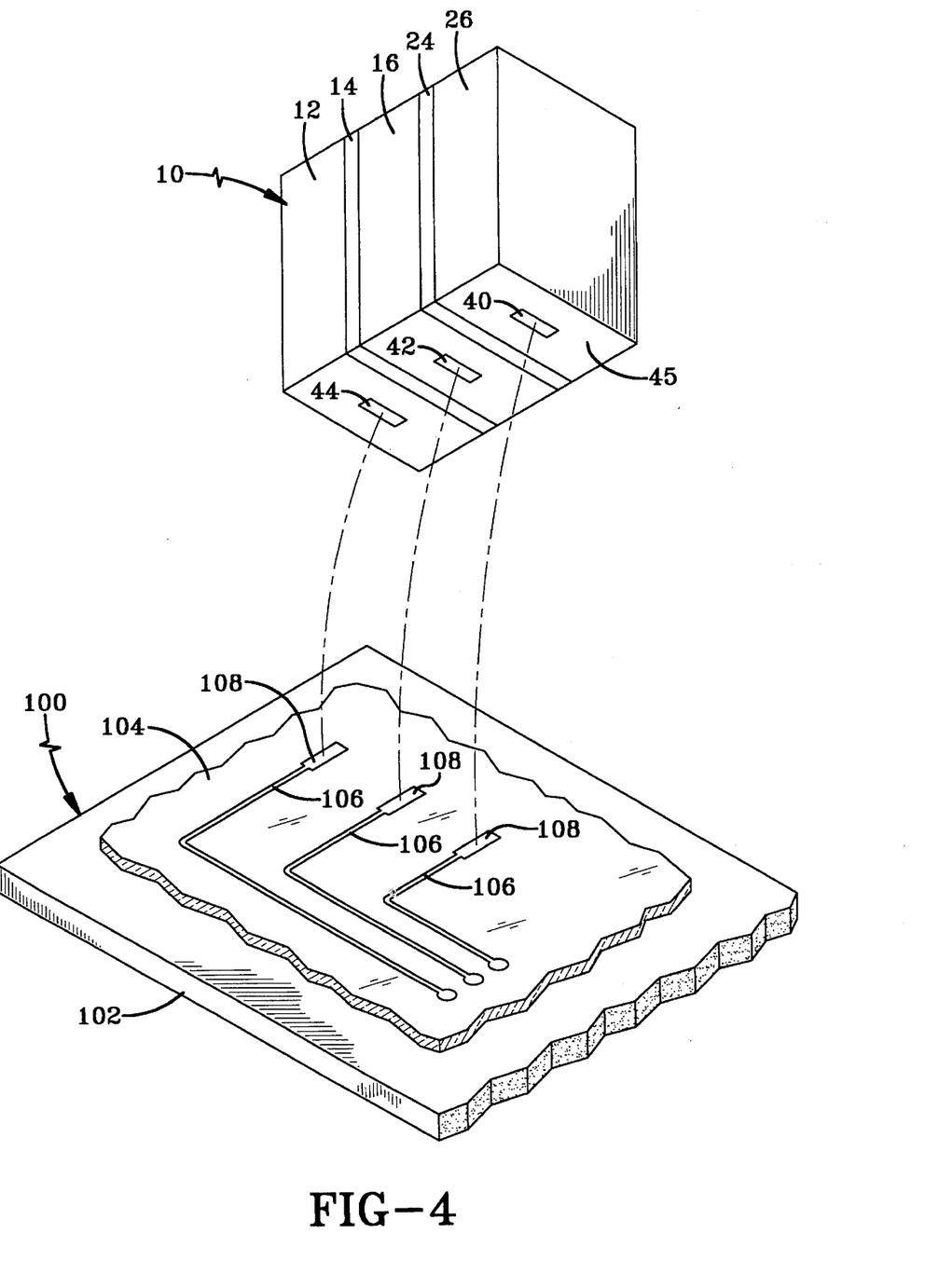
FIG. 4 is a partially disassembled view of the sensing element of FIG. 1 mounted directly to a glass coated silicon circuit board, in accordance with the present invention.
Figure 5:
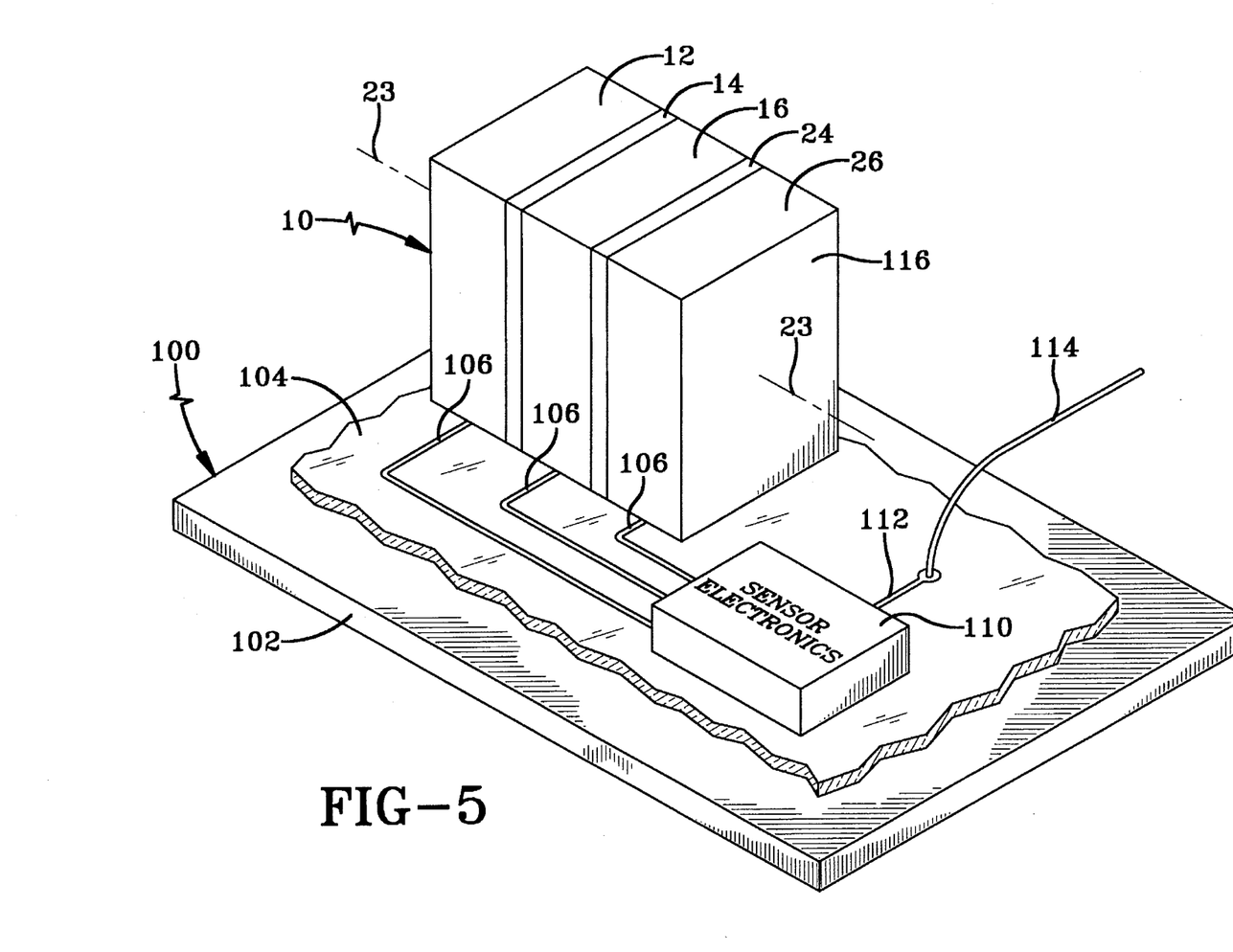
FIG. 5 is a perspective view of the sensing element of FIG. 4 directly electrically mounted to the glass coated silicon circuit board, in accordance with the present invention.

Referring now to FIGS. 4 and 5 of the present invention, we have found that the sensing element 10 (FIGS. 1 and 2) may be directly electrically and/or mechanically mounted on the side 45 to a circuit board 100. The circuit board 100 comprises a silicon base (or support) 102 having a thickness of about 0.5 mm. Above the silicon base is a layer (or coating) 104 of glass, e.g., an alkali-borosilicate glass, typically Corning type 7070 or type 7740 (PYREX®) or HOYA type SD-1 or type SD-2, having a thickness of about 0.10 mm. Other thicknesses may be used if desired. On the surface of the glass layer 104 are standard electrically conductive hybrid circuit board traces 106 of the type typically used on hybrid electronic circuit boards, e.g., a three layer composition of titanium/tungsten-nickel-gold, having a thickness of about 3 microns. Each of the traces 106 has a conductive pad 108 where electrical contact is to be made to the associated metallic pads 40–44 on the sensing element 10. The silicon base layer 102 is used to provide a matched thermal expansion support layer for the glass layer 104. Other material may be used if desired to provide such support to the glass layer 104.

Additionally, known electronic circuits 110 (FIG. 5) are disposed on the glass layer 104 and soldered to the traces 106. The output from the electronics 110 is provided on a trace 112. A lead wire 114 is soldered or wire-bonded to the end of the trace 112 to provide an output signal.

The electronics 110 are known low frequency, e.g., less than about 100 Khz, signal conditioning and measurement electronics comprising operational amplifiers, transistors, resistors, capacitors, such as is described in: H. Leuthold et al, "An ASIC for High-resolution Capacitance Micro-accelerometers", Sensors and Actuators, A21–A23, pp 278–281 (1990); U.S. Pat. No. 4,987,779, entitled "Pulse Driven Accelerometer Arrangement", to McBrien; or U.S. Pat. No. 5,069,071, entitled "Vibration Monitoring in the Frequency Domain with a Capacitive Accelerometer", to McBrien.

Figure 6:
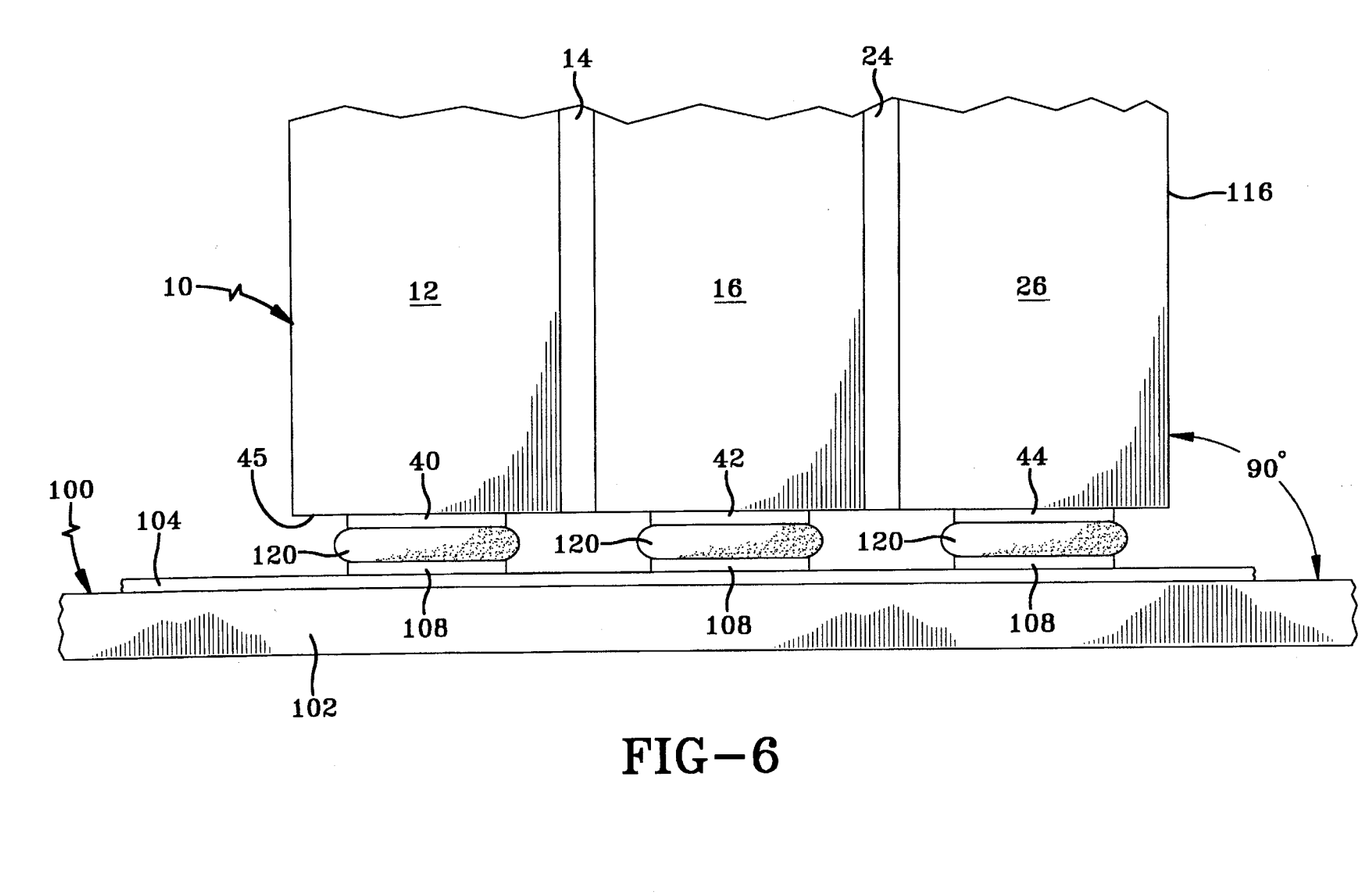
FIG. 6 is a side cut-away blown-up view of the sensing element of FIG. 4 mounted to the glass coated silicon circuit board, in accordance with the present invention.

Referring to FIGS. 4, 5, and 6, the sensing element 10 is rigidly bonded (or hard-mounted) to the pads 108 of the traces 106 by a suitable solder 120 that provides a rigid or hard mechanical attachment and an electrical connection, e.g., a solder alloy of Sn—Pb (tin-lead) or equivalent others. Such solder mounting may be performed by robotic devices which align the circuit board 100 to be perpendicular to the outer surface 116 of the silicon layer 26, which is parallel to the proof mass 18 (FIG. 2). As such, the solder 120 between each of the pads 108 and the respective bond pads 40–44 on the sensing element 10 will make up for any imperfections in the surface 45, thereby allowing for highly accurate 90° direct-mounting, e.g., ±0.5°.

Additionally, the invention eliminates the need for the flying leads 50–54 of prior art FIGS. 1 and 2 in favor of circuit board traces 106 which have a predetermined fixed distance between them and, thus, a predetermined fixed capacitance, as discussed more hereinafter.

The glass layer 104 is selected to be the same as or substantially similar to the glass used in the layers 24,14 in the sensing element 10 (FIG. 1), which has a thermal expansion coefficient that is substantially the same as that of the silicon layers 12,16,26. More specifically, the glass coefficient of expansion is about $3.2 \times 10^{-6}/°$ C. (as discussed hereinbefore) and the silicon coefficient of expansion is about 1.8 to $3.2 \times 10^{-6}/°$ C. in the temperature range of $-40°$ to $125°$ C. As such, there is a much better match in thermal expansion coefficients between the sensing element 10 and the circuit board 100 than available using prior art techniques, thereby minimizing any possible stresses induced on the sensing element 10 over an operational temperature range of the device, e.g., $-40°$ C. to $125°$ C. The glass coated silicon board 100 may be similar to that described in U.S. Pat. No. 4,737,236, entitled "Method of Making Microwave Integrated Circuits", to Perko et al; however any glass coated board may be used if desired.

As a result of direct mounting of the sensing element 10, the fabrication process for the complete acceleration sensor package has been greatly simplified and greatly reduced in cost because the sensor no longer needs to be mounted on the balls 62 with compliant adhesive 64 and the flying leads 50–54 are no longer required.

Another beneficial byproduct of the elimination of the flying leads 50–54 (FIG. 1) that occurs from the invention is the ability to make the sensing element 10 much smaller than in the prior art. The reason is that in the prior art the thickness of the base silicon layer 12 (FIG. 1), needed to be thick to minimize the stresses exerted on the proof mass because that was the layer which was mounted to the non-thermally-matched circuit board 60. Similarly, the upper silicon layer 26 of the prior art also needed to be thick to provide rigidity and match the bottom silicon layer 12 for symmetrical cancellation of induced stresses.

However, by elimination of externally induced stresses from the circuit board, the direct mounting technique of the present invention allows the size of the layers to be greatly reduced, e.g., down to overall dimensions of about: 1.50 mm wide, 1.50 mm long, and 1.29 mm high. Even smaller dimensions may be used if desired. In such a device, both silicon layers 12,26 have the same thickness of about 0.37 mm and the glass dielectric layers have a thickness of about 0.15 mm. The proof mass 18 of the reduced size sensing element has dimensions of about: 0.58 mm long×0.76 mm wide by 0.25 mm high (using the same orientation as in FIG. 1). Also, the gaps 34,36 between the proof mass 18 and the electrodes 30,32 have a steady state, no acceleration spacing of 0.0015 mm.

Furthermore, the elimination of the flying leads 50–54 and the replacement of such leads with electrically conductive traces 106 on the glass board 104 allow the external capacitance seen by the sensing element 10 to be fixed, as discussed hereinbefore. Therefore, such trace capacitance can be precalculated based on the circuit board layout design and can be consistently produced at a constant known value in high volume manufacture. As such, the wide variation in stray capacitance associated with the prior art leads 50–54 no longer exists. The stray capacitance associated with the prior art flying leads caused the internal capacitances of the prior art sensing element to be large so as to minimize this variational capacitive effect on the capacitance measurement. However, once the capacitance is fixed, such external capacitance is a known substantially constant bias value which can be compensated for in the sensing measurement, thereby allowing the internal capacitance values to approach the external capacitance value seen by the sensing element. Consequently, the design of the internal capacitances within the sensing element 10 between the proof mass 18 and the electrodes 30,32 can be reduced in magnitude, thereby allowing the sensing element 10 to be made much smaller. Therefore, such reduced size sensing element will take up less board area and allow many more sensing elements to be produced for each silicon wafer.

Although the invention has been described with respect to a three silicon layer differential capacitance accelerometer, it should be understood that a one-sided capacitive accelerometer may be used if desired. In that case, there would typically be three layers, silicon-glass-silicon. Alternatively, the invention will work equally well in an analogous way with pressure sensors, such as a differential capacitive pressure sensor like that described in U.S. Pat. No. 4,879,627 entitled "Differential Capacitive Pressure Sensor with Over-Pressure Protection" to Grantham, or a one-sided capacitive pressure sensor, such as described in U.S Pat. No. 4,405,970, entitled, "Silicon-Glass-Silicon Capacitive Pressure Transducer", to Swindal et al. In the case of a pressure sensor, the sensing element is mounted in the same fashion.

Also, it should be understood that the invention may be used for any silicon-based sensor having at least one electrical and/or mechanical contact to be mounted to a circuit board and being sensitive to thermally induced external stresses.

Also, there need not be a plurality of points (or regions) of adhesion of the silicon-based device to be bonded to the glass-coated mounting board. A single point (or region) of adhesion may be sufficient if such region is large enough to exert thermally induced stresses on the sensing element across the cross-section at the region of adhesion.

Further, depending on the actual sensing element configuration, the bond pads of the sensing element may be located on a surface of the glass (or dielectric) layers of the sensing element if desired. In that case, the mounting surface would be glass-on-glass, with the bond pad, conductive circuit board trace, and solder located in between.

Further, instead of using solder to provide an electrical and mechanical hard-mount, a conductive epoxy may be used, such as Part No. epo-tek H20E, by Epoxy Technology, Inc. Other materials may be used if desired provided such material provides a hard mechanical attachment as well as an electrical connection between the sensing element and the mounting board.

Also, instead of providing both an electrical connection and mechanical hard-mounting, the invention may be used to provide solely mechanical hard-mounting of the sensing element to a mounting board. For example, in FIG. 1, the rigid balls 62 and the compliant adhesive 64 may be removed and the lower silicon base layer 12 mounted directly to the glass coated mounting board 100 of FIGS. 4 and 5. In that case, the metallic pads 40–44 and the conductive circuit board traces 106 are not required, and the adhesive used for mounting need not be electrically conductive nor thermally compliant over temperature. Alternatively, the rigid balls 62 may continue to be used; however, instead of the compliant adhesive, a non-compliant adhesive which is more conducive to being used near electronics may be used.

Instead of using doped silicon as the conductive semiconductor used in the sensing element, any doped semiconductor may be used if desired. Also, instead of using glass as the dielectric in the sensing element, any dielectric material may be used if desired, provided the thermal expansion coefficient of such dielectric is closely matched to the semiconductor material used on the mounting surface of the sensing element. Further, instead of using glass as the dielectric material on the surface of the mounting board, any dielectric material may be used if desired, provided the thermal expansion coefficient of such material is closely matched to the semiconductor and dielectric materials used on the mounting surface of the sensing element.

Instead of a solid continuous dielectric layer on the upper surface of the mounting board, such surface may be striped with dielectric and semiconductor materials having thermal expansion coefficients that match those of the mounting surface of the sensing element 10.

Further, the dielectric layer 104 may be a layer of silicon dioxide ($SiO_2$) grown on the silicon support layer 102 (FIGS. 4,5). However, if the sensing element 10 is to be mounted on the side 45, the dielectric layer 104 should be thick enough to minimize stray capacitance. Still further, the silicon support layer 102 need not be present if the dielectric layer 104 is thick enough so as not to need support.

Moreover, the invention may be applied to any sensing element made of any material and any mounting board made of any material provided the sensing element is sensitive to external stresses applied to the sensing element through the mounting surface of the sensing element.

It suffices for the present invention that the thermal expansion coefficient of each material of the mounting surface of the sensing element closely matches the thermal expansion coefficient of the material in the associated region of the mounting surface of the mounting board to which the sensing element is mounted. If a plurality of separate regions (or points) of the mounting surface of the sensing element are mounted to the mounting board, the thermal expansion coefficients of all the materials on the mounting surface of the sensing element and of the mounting surface of the mounting board where such mounting exists and the unmounted portions between such regions must be closely matched.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A capacitive sensor for sensing acceleration forces comprising a mounting board to operatively receive and support a sensing means to sense acceleration forces and generate at least one signal in response to the acceleration forces, said sensing means comprising a plurality of silicon layers having a dielectric insulator disposed between adjacent silicon layers to cooperatively form a sensing element including a sensing element mounting surface and a plurality of electrically conductive contacts formed on said element mounting surface, each of said plurality of electrically conductive contacts being disposed in operative relationship to one of said plurality of silicon layers to receive a corresponding signal therefrom when the accelerator forces are sensed by said capacitance sensor, said mounting board including a board mounting surface and a plurality of electrically conductive traces mounted to said board mounting surface and corresponding to one of said plurality of electrically conductive contacts, each of said electrically conductive traces comprising an electrically conductive pad and a corresponding electrically conductive path each of said conductive traces having a substantially fixed capacitance, said element mounting surface being disposed relative to said board mounting surface such that each of said electrically conductive contacts operatively engages said electrically conductive pad to electrically connect each of said silicon layers through said corresponding electrically conductive contacts and corresponding said electrically conductive traces to an external circuit to feed said signal corresponding to each of said silicon layers to the external circuit over a corresponding circuit comprising said corresponding plurality of electrically conductive contacts and said electrically conductive traces, said corresponding circuit having a predetermined substantially fixed capacitance to reduce stray capacitance.

2. The capacitive sensor of claim 1 wherein said board mounting surface and said element mounting surface are each constructed of material having substantially the same coefficient of thermal expansion thereby minimizing thermally-induced stresses exerted on said sensing means by said mounting board over a predetermined operational temperature range.

3. The capacitive sensor of claim 2 wherein said board mounting surface adjacent each of said plurality of electrically conductive contacts and said element mounting surface adjacent each of said plurality of electrically conductive tracers are each constructed of material having substantially the same coefficient of thermal expansion thereby minimizing thermally-induced stresses exerted on said sensing means by said mounting board over a predetermined operational temperature range.

4. The capacitive sensor of claim 2 further including a mounting means disposed between said element mounting surface and said board mounting surface, said mounting means comprising a dielectric layer to further reduce stray capacitance.

5. The capacitive sensor of claim 3 further including a mounting means disposed between said element mounting surface and said board mounting surface, said mounting means comprising a dielectric layer to further reduce stray capacitance.

6. The capacitive sensor of claim 1 further including a mounting means disposed between said element mounting surface and said board mounting surface, said mounting means comprising a dielectric layer to further reduce stray capacitance.

7. The capacitive sensor of claim 6 wherein said board mounting surface adjacent each of said, plurality of electrically conductive contacts and each of said element mounting surface adjacent each said plurality of electrically conductive tracers are constructed of material having substantially the same coefficient of thermal expansion thereby minimizing thermally-induced stresses exerted on said sensing means by said mounting board over a predetermined operational temperature range.

8. The capacitive sensor of claim 7 wherein said board mounting surface and said element mounting surface are constructed of material having substantially the same coefficient of thermal expansion thereby minimizing thermally-induced stresses exerted on said sensing means by said mounting board over a predetermined operational temperature range.

* * * * *